April 20, 1954     G. H. RENDEL     2,676,146
DIFFERENTIAL METER
Filed Dec. 13, 1950
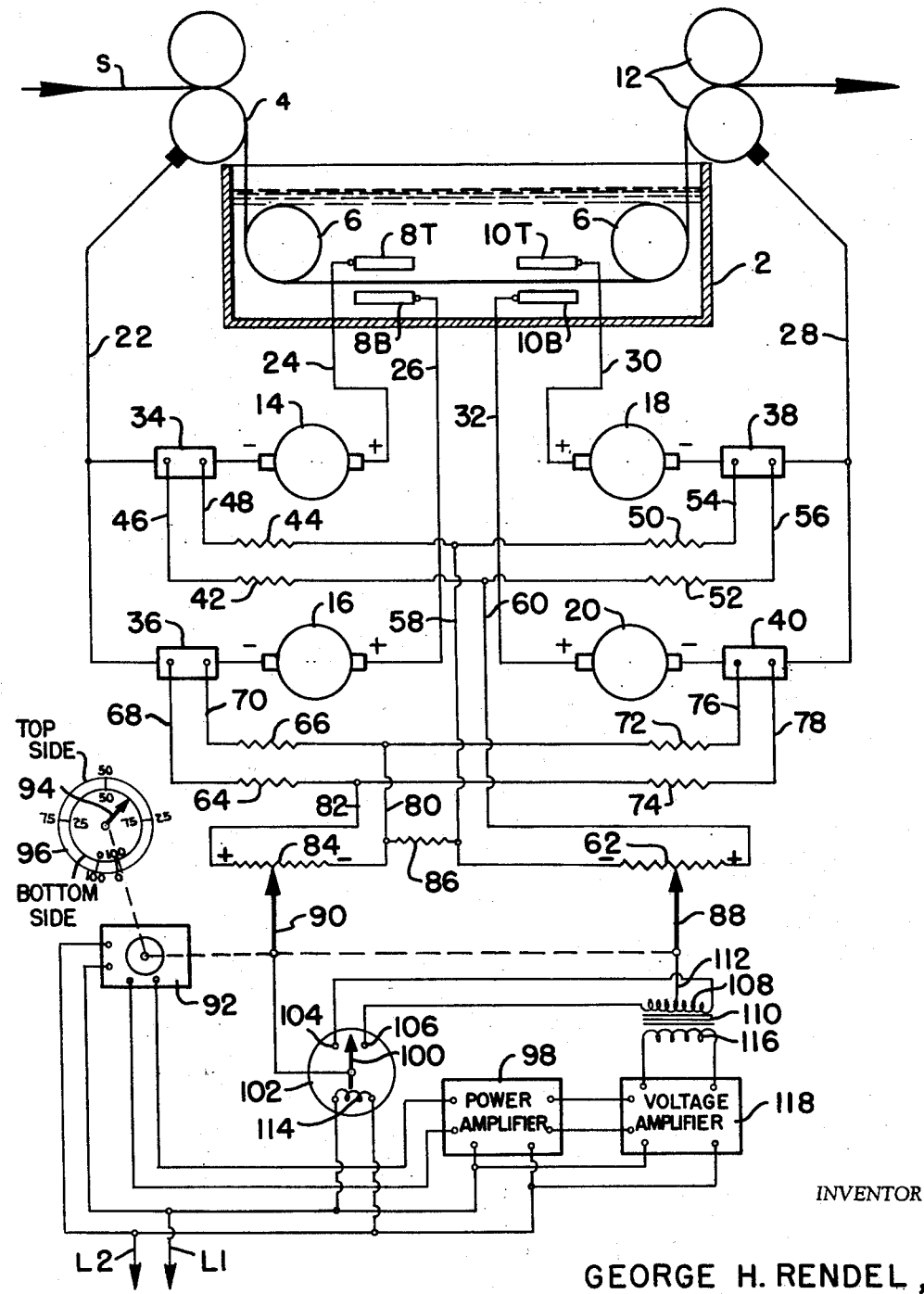
INVENTOR
GEORGE H. RENDEL,
BY Donald G. Dalton
HIS ATTORNEY Patented Apr. 20, 1954

2,676,146

UNITED STATES PATENT OFFICE 2,676,146

DIFFERENTIAL METER

George H. Rendel, Mount Lebanon, Pa., assignor to United States Steel Corporation, a corporation of New Jersey Application December 13, 1950, Serial No. 200,586

2 Claims. (Cl. 204—195)

This invention relates to a differential meter and more particularly to such a meter for determining the ratio of tin electrolytically deposited on opposite sides of a continuous steel strip. In electrolytic tinning lines marked economies and improvement in quality can be made if the quantity of tin being deposited on the strip is known at all times. Apparatus for determining the quantity of tin deposited is disclosed in my copending application, Serial No. 31,772, filed June 8, 1948, now Patent No. 2,603,595. In that application two plating generators are shown, one for supplying current to the anode on one side of the strip and the other for supplying current to the anode on the other side of the strip. Means are provided for determining the ratio between the tin deposited on opposite sides of the strip, which means includes a shunt in the positive connections from each of the generators. In many instances it is necessary to provide more than one generator for supplying current to each side of the strip. While a totalizing shunt could be used for obtaining a potential proportional to the plating current, there are many disadvantages thereto. The means for comparing the two potentials also has some disadvantages.

It is therefore an object of my invention to provide an improved differential meter for determining the relative thickness of tin coating on opposite sides of a continuous moving strip without the necessity of using a totalizing shunt.

This and other objects will be more apparent after referring to the following specification and attached drawing, in which:

The single figure is a schematic wiring diagram showing a specific embodiment of my invention.

Referring more particularly to the drawing, the reference numeral 2 indicates a plating tank containing an electrolyte. The strip S to be coated passes over a conductor roll 4 into the tank and is directed by means of a deflector roll 6 between anodes 8T, 8B, 10T and 10B. The strip passes out of the tank over conductor roll 12. Plating current is provided for the anodes 8T, 8B, 10T and 10B by means of identical generators 14, 16, 18 and 20, respectively. The negative terminals of generators 14 and 16 are connected to the conductor roll 4 through their common lead 22 so that the strip S is maintained at cathode potential. The positive terminal of generator 14 is connected to the anode 8T through a lead 24 and the positive terminal of generator 16 is connected to the anode 8B through a lead 26. The negative terminals of generators 18 and 20 are connected to the conductor roll 12 through their common lead 28. The positive terminal of generator 18 is connected to the anode 10T through a lead 30 and the positive terminal of generator 20 is connected to the anode 10B through the lead 32. If desired, the negative terminals of all the generators may be connected to a single conductor roll, but it is preferred to use the arrangement shown. Shunts 34, 36, 38 and 40 are connected in the negative leads of the generators 14, 16, 18 and 20, respectively. The voltage drop across each of these shunts is proportional in amplitude to the current passing therethrough. Resistances 42 and 44 are connected to the terminals of shunt 34 by means of lead wires 46 and 48, respectively. Resistances 50 and 52 are connected to the terminals of shunt 38 by means of lead wires 54 and 56, respectively. The resistances 44 and 50 are connected to a lead wire 58 and resistances 42 and 52 are connected to a lead wire 60. The lead wires 58 and 60 are connected to a slide wire potentiometer 62. Resistances 64 and 66 are connected to the terminals of shunt 36 by means of lead wires 68 and 70, respectively. Resistances 72 and 74 are connected to the terminals of shunt 40 by means of lead wires 76 and 78, respectively. The resistances 66 and 72 are connected to a lead wire 80 and the resistances 64 and 74 are connected to a lead wire 82. The lead wires 80 and 82 are connected to a slide wire potentiometer 84. The resistances 42, 44, 50, 52, 64, 66, 72 and 74 and slide wire potentiometers 62 and 84 may be of the same ohmic value. A resistance 86 connects the lead wires 58 and 80, thus connecting the negative terminal of shunt 62 to the negative terminal of shunt 84. The potentiometers 62 and 84 are provided with moving contact arms 88 and 90, respectively. A positioning motor 92 is mechanically connected to the contact arms 88 and 90 and also to a pointer 94 associated with an indicating dial 96. Positioning motor 92 is a reversible induction motor having two windings, one of which is continuously energized from the A. C. supply lines L1 and L2 and the other of which is energized from a power amplifier 98. Contact arm 90 is electrically connected to the vibrating contact 100 of a converter 102 whose stationary contacts 104 and 106 are connected to the primary windings 108 of a center tapped transformer 110. The center tap 112 of the primary winding 108 is electrically connected to the contact arm 88. Power for driving the vibrating contact 100 is obtained from an energizing coil 114 which is connected to the power lines L1 and L2. The converter 102 is a single pole double throw switch operated in synchronism with the power supply voltage by means of the energizing coil 114. The switch is polarized by a permanent magnet so that one of its stationary contacts 104 or 106 will be in contact with the vibrating contact 100 during the positive half-cycle and the other stationary contact will be in contact with the vibrating contact 100 during the negative half-cycle. The secondary winding 116 of the transformer 110 is connected to a voltage amplifier 118 which in turn is connected to the power amplifier 98. The converter 102 in combination with transformer 110, voltage amplifier 118 and power amplifier 98 recognizes amplitude and the direction of unbalance between contact arms 88 and 90. Therefore the direction and speed of rotation of motor 92 is dependent on the magnitude and polarity of the potentials existing between contact arms 88 and 90.

The resistor networks operate as follows:

Assuming a current flow from generator 14 that causes a potential drop of .050 volt across the terminal of shunts 34 and zero current from generator 18 that results in zero potential drop across the terminal of shunts 36 the potential drop between wires 46 and 48 will be .050 volt and there will be zero voltage drop between wires 54 and 56. The .050 volt drop between wires 46 and 48 will flow through resistors 42, 44, 50 and 52, thus causing a potential drop of .0125 volt across each of the four resistors with a resultant potential of .025 volt appearing across wires 58 and 60. If the current flow on generator 18 is increased until a potential drop of .050 volt appears across the terminal shunt 38 while the current load through generator 16 remains unchanged the potential drop between wires 46 and 48 and also between wires 54 and 56 is .050 volt. As indicated in the drawing, wires 46 and 56 are of like polarity and wires 48 and 54 are also of like polarity. Since the potential drops across shunts 34 and 38 are equal in amplitude and their interconnecting wires are connected to like polarity, there will be zero current flow through resistors 42, 44, 50 and 52. Therefore, there is zero voltage drop across each of the resistors and the potential across wires 58 and 60 is .050 volt. In a similar manner a resistor network may be employed in combination with any number of current shunts to provide an accurate measurement of the sum of the currents flowing through all of the shunts. In the same manner, the resistor network including resistors 64, 66, 72 and 74 is used to obtain a potential proportional to the total output of generators 16 and 20.

Assuming that each of the generators 14, 16, 18 and 20 were each operating so that a potential drop of .050 volt appears across the terminals of each of shunts 34, 36, 38 and 40, the impressed potential on potentiometers 62 and 64 will be .050 volt. Assuming that contact arms 88 and 90 were located at the extreme left end of the respective slide wires, a potential of .050 volt would exist between the contact arms with arm 90 being of positive polarity with respect to arm 88. This will cause flow of current from arm 90 through vibrating contact 100, stationary contacts 104 and 106 and primary winding 108 to arm 88. Flow of current in this direction through primary winding 108 will cause flow of current through secondary winding 116 in a manner which will cause motor 92 to operate in a direction to move arms 88 and 90 to the midpoints of slide wires 62 and 84 which is the only point at which there is zero potential between these contact arms. Movement of the motor 92 will also cause pointer 94 on dial 96 to read 50 on both scales, thus indicating that the tin coating on one side of the strip is equal to that on the other side. Assuming that generators 16 and 20 are deenergized while generators 14 and 18 continue to operate under the same conditions as before, there will be a potential drop of .050 volt across potentiometer 62 and zero potential across potentiometer 84. Since there is no voltage across potentiometer 84, there will be a negative potential by means of wires 80 and 82 and the connection by means of resistance 86 to wire 58. Therefore, a potential will exist between contact arms 88 and 90 with arm 88 being more positive than arm 90. This will cause current flow from arm 88 through primary winding 108 to stationary contacts 104 and 106 and vibrating contact 100 to arm 90. This will cause directional current flow through secondary winding 116 which is impressed on the motor 92 in such a manner that it will rotate in a direction to move contact arms 88 and 90 to the extreme left end of potentiometers 62 and 84 where the potential between the contact arms 88 and 90 will be zero. The motor 92 will also cause pointer 94 to move to its extreme left end of travel thus indicating that 100% of the current is being applied to the top side of the strip and zero current to the bottom side.

Assuming that 7500 amperes are being applied to the top anodes and 2500 amperes to the bottom anodes the motor 92 will move the arms 88 and 90 to a point one-fourth of the way from the left hand end of slide wires 62 and 84. At the same time the pointer 94 will be moved to the position where it indicates that 75% of the total plating current is being applied to the top side of the strip and 25% to the bottom side of the strip.

While one embodiment of my invention has been shown and described it will be apparent that other adaptations and modifications may be made without departing from the scope of the following claims.

I claim:

1. Apparatus for determining the proportion of metal deposited on each side of a strip passing over a conductor roll and between anodes which comprises means for supplying plating current to the anodes on each side of the strip, means for obtaining a potential proportional to the plating current supplied to the anodes on one side of the strip, means for obtaining a potential proportional to the plating current supplied to the anodes on the other side of the strip, a pair of potentiometers each having an operating arm, means electrically connecting one terminal of one potentiometer to the like terminal of the other potentiometer, means electrically connecting the first named means across one of said potentiometers, means electrically connecting the second named means across the other potentiometer, a reversible motor having a control winding, mechanical connections between said motor and said arms, an indicator, an arm for said indicator mechanically connected across said motor, a converter having a vibrating contact and two stationary contacts, a transformer having a center tapped primary winding, means electrically connecting the ends of said primary winding to said stationary contacts, means electrically connecting one of said arms to the vibrating contact, means electrically connecting the other of said arms to the center tap of said primary winding, and means electrically connecting the secondary winding of said transformer to the control winding of said motor.

2. Apparatus for determining the proportion of metal deposited on each side of a strip passing over a conductor roll and between anodes which comprises a pair of generators having their positive terminals electrically connected to the anodes on one side of said strip, a second pair of generators having their positive terminals electrically connected to the anodes on the other side of said strip, electrical connections between the negative terminals of said generators and the conductor roll, a shunt in one of the connections of each generator, a pair of potentiometers each having an operating arm, means electrically connecting one terminal of one potentiometer to the like terminal of the other potentiometer, an electrical connection between the positive terminals of the shunts of the first pair of generators, a pair of resistances connected in series in said last named connection, a lead connected to the positive side of the first of said potentiometers and to said last named connection between the resistances therein, an electrical connection between the negative terminals of the shunts of the first pair of generators, a pair of resistances connected in series in said last named connection, a lead connected to the negative side of the first of said potentiometers and to said last named connection between the resistances therein, an electrical connection between the positive terminals of the second pair of shunts, a pair of resistances connected in series in said last named connection, a lead connected to the positive side of the second of said potentiometers and to said last named connection between the resistances therein, an electrical connection between the negative terminals of the second pair of shunts, a pair of resistances connected in series in said last named connection, a lead connected to the negative side of the second of said potentiometers and to said last named connection between the resistances therein, a reversible motor having a control winding, mechanical connections between said motor and said arms, an indicator, an arm for said indicator mechanically connected to said motor, a converter having a vibrating contact and two stationary contacts, a transformer having a center tapped primary winding, means electrically connecting the ends of said primary winding to said stationary contacts, means electrically connecting one of said arms to the vibrating contact, means electrically connecting the other of said arms to the center tap of said primary winding, and means electrically connecting the secondary winding of said transformer to the control winding of said motor.

References Cited in the file of this patent
UNITED STATES PATENTS

| Number | Name | Date |
|---|---|---|
| 2,272,914 | Keeler | Feb. 10, 1942 |
| 2,288,310 | Zuschlag | June 30, 1942 |
| 2,375,158 | Wills | May 1, 1945 |
| 2,473,918 | Stoltz | June 21, 1947 |